US010378976B2

(12) United States Patent
Clarke (10) Patent No.: US 10,378,976 B2
(45) Date of Patent: Aug. 13, 2019

(54) BALANCE DEVICES (71) Applicant: THE COMMONWEALTH OF AUSTRALIA, Canberra (AU)

(72) Inventor: David Clarke, Brunswick (AU)

(73) Assignee: The Commonwealth of Australia, Of the Secretary, Department of Defence, Canberra (AU)

(*) Notice: Subject to any disclaimer, the term of this patent is extended or adjusted under 35 U.S.C. 154(b) by 238 days.

(21) Appl. No.: 15/301,271

(22) PCT Filed: Mar. 31, 2015

(86) PCT No.: PCT/AU2015/050138
§ 371 (c)(1),
(2) Date: Sep. 30, 2016

(87) PCT Pub. No.: WO2015/149123
PCT Pub. Date: Oct. 8, 2015

(65) Prior Publication Data
US 2017/0059425 A1 Mar. 2, 2017

(30) Foreign Application Priority Data
Mar. 31, 2014 (AU) .............................. 2014901156

(51) Int. Cl.
*G01L 1/26* (2006.01)
*G01L 1/22* (2006.01)
(Continued)

(52) U.S. Cl.
CPC .......... *G01L 1/2218* (2013.01); *G01G 3/1408* (2013.01); *G01G 21/244* (2013.01); *G01L 1/26* (2013.01); *G01L 3/108* (2013.01)

(58) Field of Classification Search
CPC ........ G01L 9/12; G01L 1/2218; G01G 3/1408
See application file for complete search history.

(56) References Cited

U.S. PATENT DOCUMENTS 2,768,526 A 10/1956 Trimble, Jr. et al.
2,785,569 A 3/1957 Miller
(Continued)

FOREIGN PATENT DOCUMENTS

| GB | 763063 | 12/1956 | |
| GB | 1 267 626 | 3/1972 | |
| GB | 1267626 A * | 3/1972 | ......... E21B 47/0006 |

OTHER PUBLICATIONS

International Search Report, dated Jul. 3, 2015, for PCT/AU2015/050138, 4 pages.
(Continued)

*Primary Examiner* — Jamel E Williams
(74) *Attorney, Agent, or Firm* — Seed IP Law Group LLP (57) ABSTRACT

A balance device comprises first, second and third components. The first, second and third components include substantially cylindrical first, second and third central portions, respectively, and which are coaxial with one another. The balance device further comprises a first set of connectors for coupling the first component to the third component and a second set of connectors for coupling the second component to the third component. The connectors accommodate axial movement in response to relative axial forces between the first and second components and minimise rotational movement about the axial direction in response to relative axial torque between the first and second components.

31 Claims, 7 Drawing Sheets (51) Int. Cl.
*G01L 3/10* (2006.01)
*G01G 3/14* (2006.01)
*G01G 21/24* (2006.01)

(56) References Cited

U.S. PATENT DOCUMENTS

| | | |
|---|---|---|
| 4,938,059 A | 7/1990 | Faucher et al. |
| 5,133,216 A | 7/1992 | Bridges |
| 5,317,915 A | 6/1994 | Choisnet |
| 5,445,036 A | 8/1995 | Hordnes et al. |
| 5,663,497 A | 9/1997 | Mole |
| 2004/0187607 A1 | 9/2004 | Kilmartin |

OTHER PUBLICATIONS

Written Opinion, dated Jul. 3, 2015, for PCT/AU2015/050138, 6 pages.

* cited by examiner

BALANCE DEVICES

TECHNICAL FIELD

Some embodiments relate to a balance device, such as a force balance based on a compound axial spring, for measuring axial loads and/or torque or for coupling a first unit to a second unit.

BACKGROUND

Figure 1:
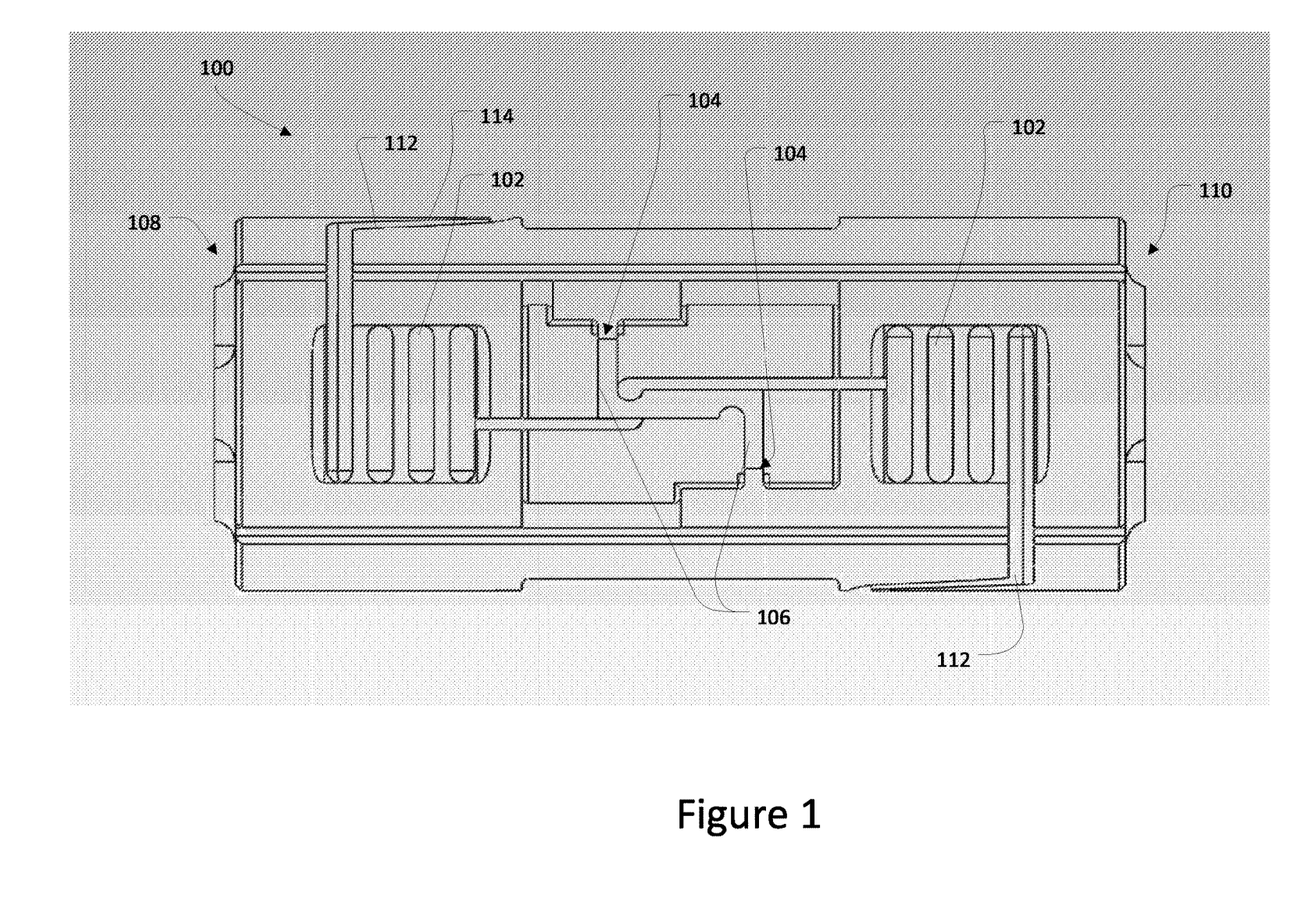
FIG. 1 is a cross sectional view of a prior art force balance.

A typical internal force balance 100 for measuring axial loads, i.e., drag at zero incidence, is illustrated in FIG. 1. The force balance 100 includes a pair of flexure hinges 102 and strain gauges 104 for measuring strain on cantilever arms 106 connecting a measurement side 108 of the balance to a non-measurement side 110 of the balance 100. When an axial load is applied to the measurement side 108 of the balance 100, the flexure hinges 102 cooperate with transverse cuts 112 disposed on a surface 114 of the balance 100 to allow a deflection, predominantly in a direction of the axial load, which approximates a parallelogram, and the axial force is determined from the strain gauges 104.

It is desired to address or ameliorate one or more shortcomings of prior art force balances or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a balance device, the balance device comprising first, second and third components including substantially cylindrical first, second and third central portions, respectively, wherein said first, second and third cylindrical portions are coaxial with one another, a first set of connectors for coupling the first component to the third component and a second set of connectors for coupling the second component to the third component, and wherein the connectors accommodate axial movement in response to relative axial forces between the first and second components and mitigate or minimise rotational movement about the axial direction in response to relative axial torque between the first and second components. The connectors may also mitigate or minimise deflections due to transverse forces and moments. For example, the connectors may be configured to be substantially rigid about the longitudinal axis of the device.

Thus, the balance device of the present disclosure may provide for increased stiffness to transverse forces and increased stiffness to axial and transverse moments. In this way, a balance device of the present disclosure, having a given stiffness in an axial direction, may exhibit a greater structural natural frequency in the direction of the transverse axes and about all axes.

The first component may further comprise a collar disposed at a first end of the first central portion and a flange disposed at a second end of the first central portion. The second component may further comprise a collar disposed toward a second end of the second central portion. A plurality of apertures may be disposed around a perimeter of the collar of the second component.

In one embodiment, the first central portion may be encircled or surrounded by the second central portion and the flange of the first component may be arranged to cooperate with the plurality of apertures of the collar of the second component such that movement of the second component relative to the first component is limited by the apertures. In one embodiment, the first central portion may be encircled or surrounded by the second central portion and movement of the second component relative to the first component may be restricted by a collar of the first component. For example, the collar of the first component may have a diameter substantially equal to the diameter of the central portion of the second component.

The collar of the first component may extend beyond a first end of the second component to form a first end, for example, a non-measurement end, of the balance device and the collar of the second component may form a second end, for example, a measurement end, of the balance device.

In one embodiment, the third central portion comprises a plurality of elongate rib members interconnected by arm members. The interconnection of the elongate rib members may allow for displacement in the radial direction. The third central portion may form a core of the coaxial central portions.

In some embodiments, the first and second components are designed to have a similar bending and torsional stiffness, for example, as a result of their shape, size, configuration and/or materials.

In some embodiments, the balance device may further comprise a third set of connectors for coupling the first component to the third component and a fourth set of connectors for coupling the second component to the third component. The first and third sets of connectors may be axially displaced from one another and the second and fourth sets of connectors may be axially displaced from one another.

In some embodiments, the first, second, third and fourth sets of connectors may each comprise at least three flexure hinges. In one example, the first, second, third and fourth sets of connectors may each comprise four flexure hinges.

In some embodiments, the first, second, third and fourth sets of connectors may each comprise an even number of flexure hinges. For example, the first, second, third and fourth sets of connectors may each comprise an even number of flexure hinges of greater than two, i.e., four or more. In some embodiments, the flexure hinges of a set of connectors may be evenly spaced from each other. For example, such an arrangement of flexure hinges may allow the balance device to have multiple planes of symmetry that provide similar stiffness to transverse loads and/or moments.

In some embodiments, the flexure hinge may be a multilayer hinge. The multilayer hinge may comprise a plurality of hinge elements interleaved with supports. A distance provided between subsequent hinge element of the multilayer hinge may be less than or substantially equal to a thickness of the hinge element. By employing multilayer hinges, increased stiffness to transverse loads and moments for a desired axial stiffness between the first and second components may be achieved.

Some embodiments relate to a transducer for measuring loads in the axial direction, the transducer comprising the balance device as described above, wherein the second component is arranged to receive an applied load. For example, the balance device may further comprise a first arm coupled between the first component and the second component, the first arm being arranged to determine a measure of axial deflection of the second component relative to the first component in response to an application of a load to the second component. At least one strain gauge sensor may be arranged to connect to the first arm to determine the measure of axial deflection. In this way, the balance device may operate as a transducer for measuring loads in the axial direction. For example, the balance device may be employed as a transducer for measuring unsteady loads in wind tunnels or cavitation tunnels, such as loads on propellers in a non-uniform wake.

Some embodiments relate to a transducer for measuring axial torque, the transducer comprising the balance device as described above, wherein the second component is arranged to receive an applied axial torque. For example, the balance device may further comprise a second arm coupled between the first component and the second component, the second arm being arranged to determine a measure of axial rotation of the second component relative to the first component in response to an application of an axial torque to the second component. At least one strain gauge sensor may be arranged to connect to the second arm to determine the measure of axial torque. In this way, the balance device may operate as a transducer for measuring torque.

Some embodiments relate to a coupling for interconnecting a first unit to a second unit, wherein the coupling comprises the balance device as discussed above, to allow for a relatively small amount of movement between the first and second units. In this way, the balance device may be employed as a compound axial spring arranged to couple a first unit to a second unit to accommodate movement or "give" in an axial direction.

Some embodiments relate to a balance device assembly comprising a balance device as described above and a temperature control mechanism to control a temperature of the balance device.

In some embodiments, the temperature control mechanism may comprise one or more conduits for conveying fluid to and/or from a chamber formed by the balance device and a sleeve for receiving the balance device and arranged to contain fluid within the chamber.

The temperature control mechanism may further comprise a plug disposed at a first end of the balance device to receive and position the conduits with respect to one another. The plug disposed at the first end of the balance device may be configured to restrict or control a communication of fluid from the first end of the balance device. The temperature control mechanism may further comprise a plug disposed at a second end of the balance device to restrict communication of fluid from the second end of the balance device.

In some embodiments, the balance device assembly may comprise a tang coupled to the balance device, for example, to the first end of the balance device, and configured to mount the balance device to an instrument or fixture. The tang may comprise a channel extending along its length to allow for fluid communication with the chamber of the balance device.

In some embodiments, the balance device assembly may comprise a shaft coupled to the balance device, for example, to the second end of the balance device, and configured to mount the balance device to a model.

BRIEF DESCRIPTION OF THE DRAWINGS

Embodiments are described in further detail below, by way of example, with reference to the accompanying drawings, in which.

DETAILED DESCRIPTION

Described embodiments generally relate to a balance device, such as a force balance device, and may be based on a compound axial spring. In some embodiments, the balance device may be employed to measure force in an axial direction, and/or axial torque, i.e., moment about the axial direction. In some embodiments, the balance device is employed for coupling a first unit to a second unit.

Figure 2:
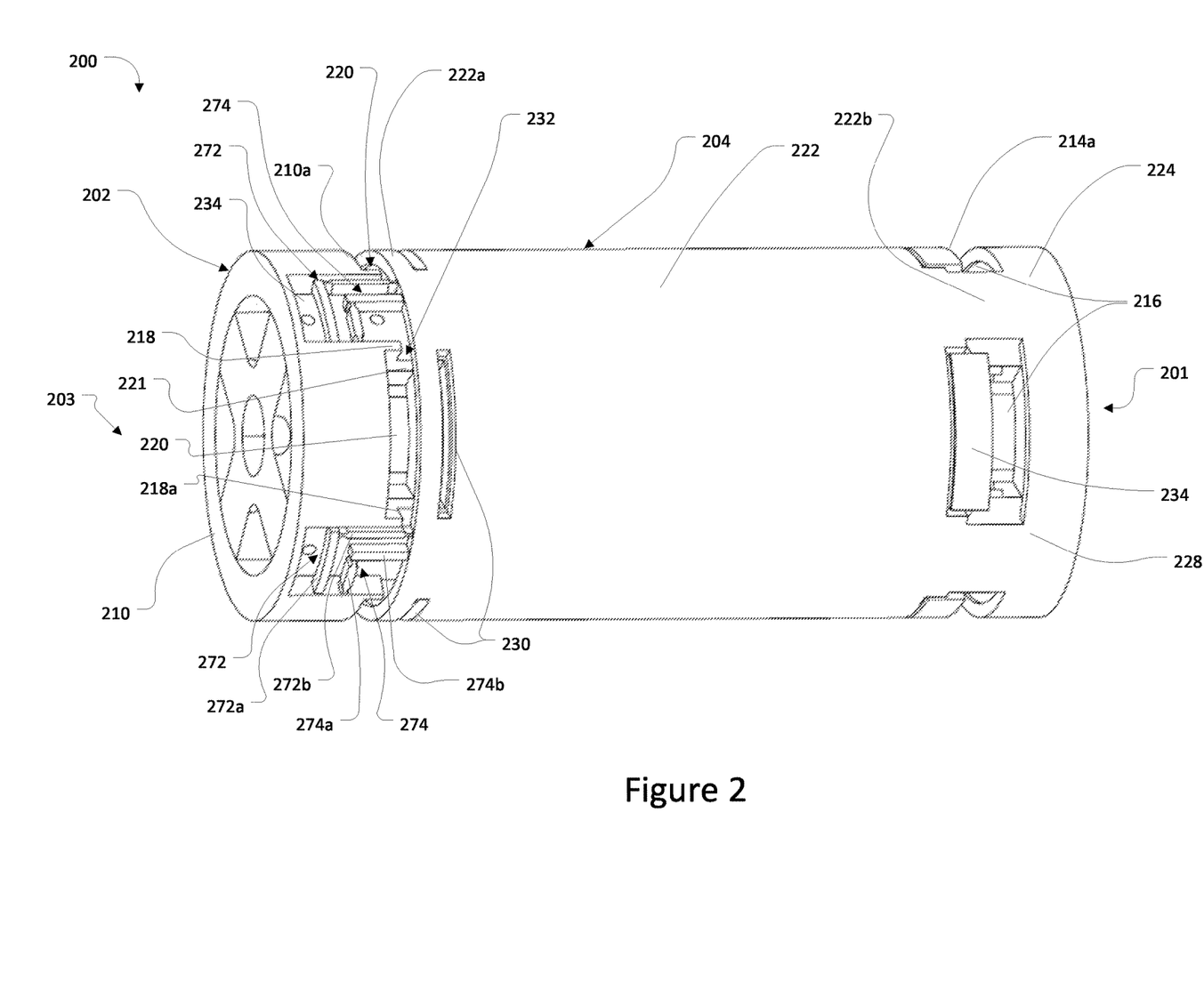
FIG. 2 is a perspective view of a balance device according to some embodiments.
Figure 3:
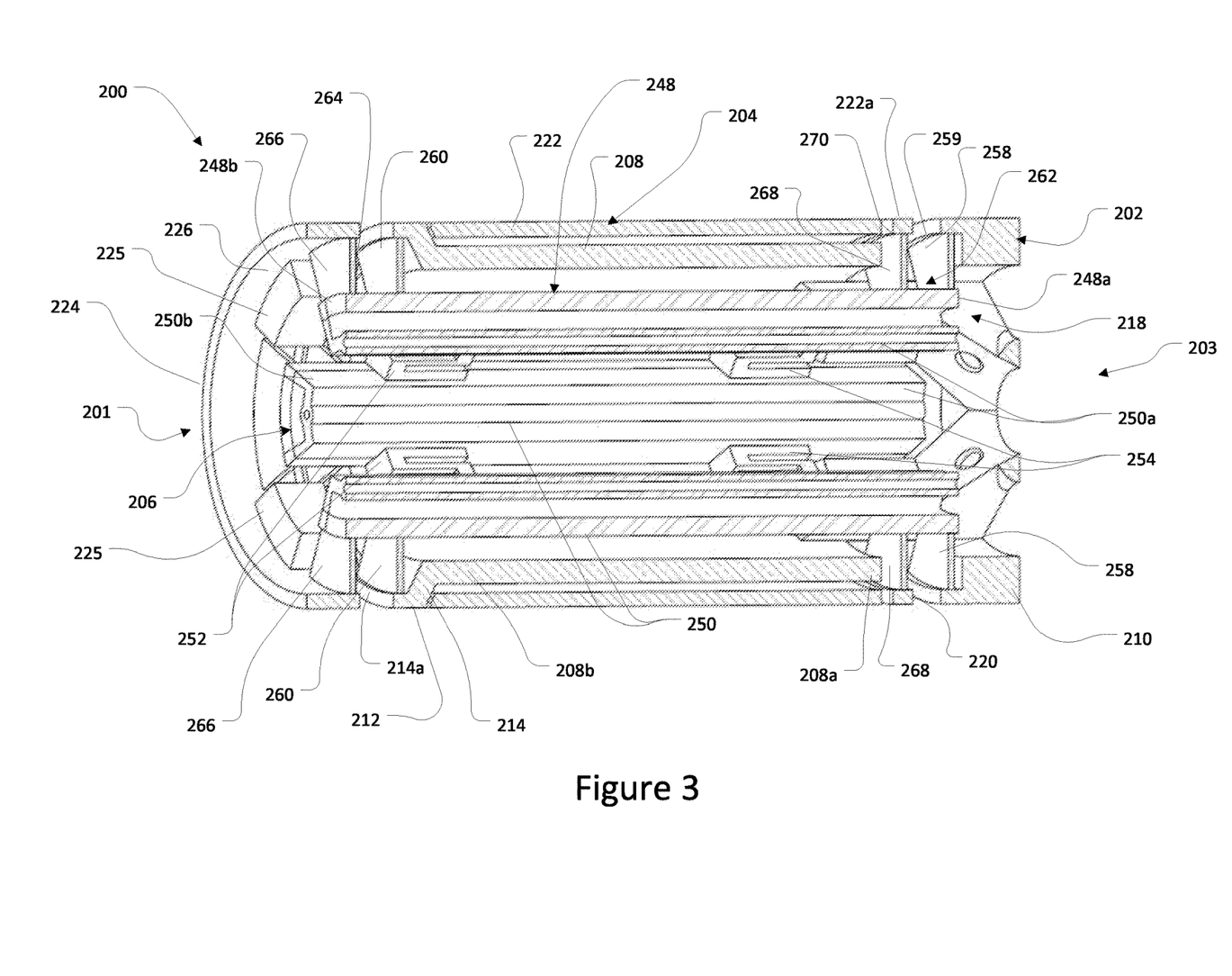
FIG. 3 is a cut-away side view of the balance device of FIG. 2.
Figure 4:
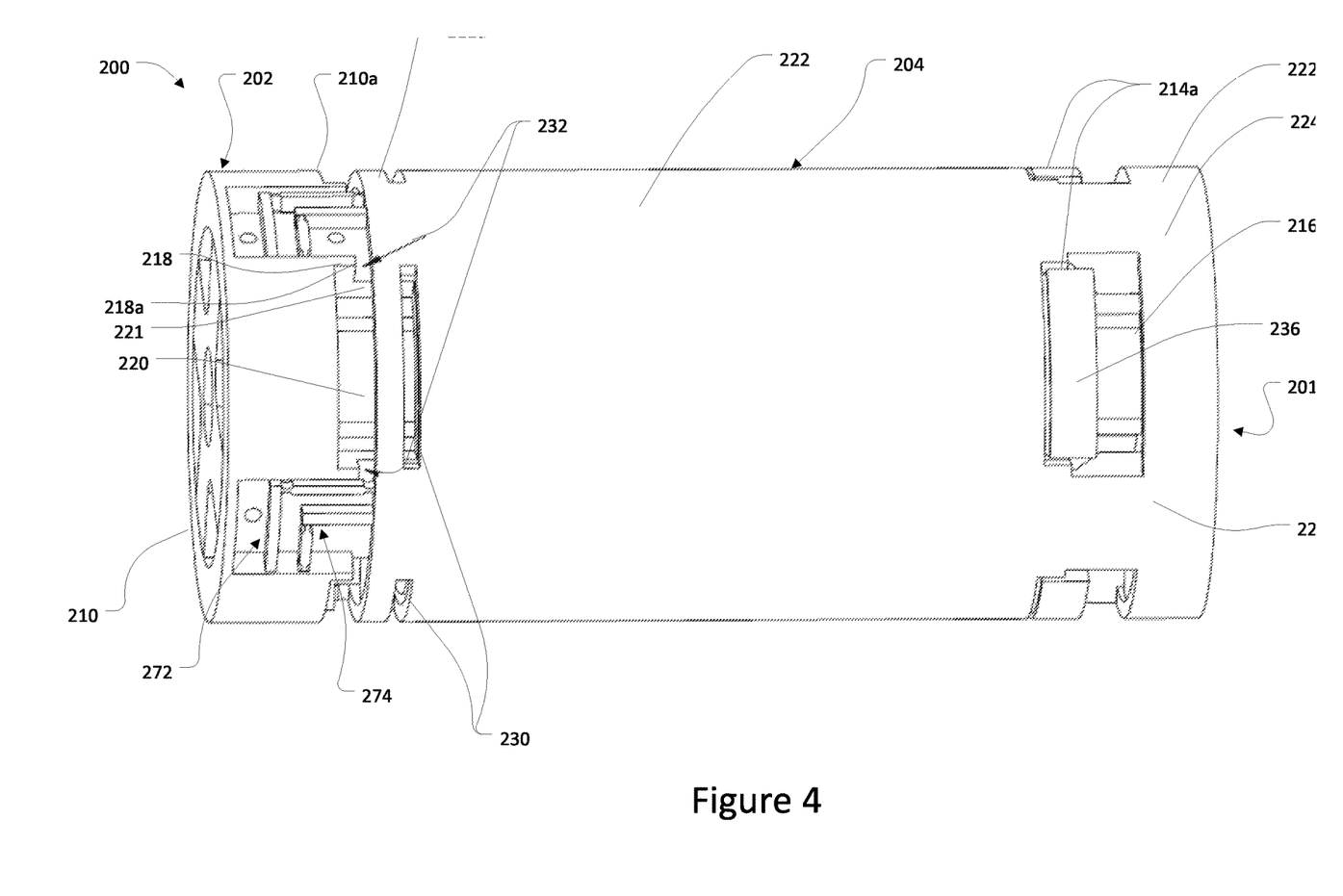
FIG. 4 is side view of the balance device of FIG. 2.

Referring to FIGS. 2, 3 and 4, there is illustrated a balance device 200 according to one embodiment. The balance device 200 comprises a first component 202 and a second component 204, each coupled to a third component 206.

As best illustrated in FIGS. 2 and 3, the first component 202 comprises a substantially cylindrical central portion 208, a collar 210 disposed at a first end 208a of the central portion 208 and a flange 212 disposed at a second end 208b of the central portion 208. In the embodiment depicted in FIGS. 2 and 3, the central portion 208 has a diameter which is less than that of the collar 210 and the flange 212. However, in some embodiments, the diameter of the central portion 208 may be greater than, substantially similar to, or less than the diameter of the collar 210 and/or the flange 212.

In some embodiments, and as best illustrated in FIGS. 3 and 4, the flange 212 comprises a plurality of discrete or non-contiguous skirt or flared portions 214 each having a rim portion 214a, and being arranged to cooperate with corresponding apertures 216 disposed on the second component 204 as discussed in more detail below with reference to FIG. 2. For example, the flared portions 214 may be configured to extend or flare outwardly from the longitudinal axis of the second component 204 and/or the longitudinal axis of the balance device 200 and the rim portion 214a may be configured to extend substantially parallel to the longitudinal axis of the second component 204 and/or the longitudinal axis of the balance device 200.

In some embodiments, and as best illustrated in FIG. 4, an end 210a of the collar 210 is substantially crenelated in cross section, defining merlons or struts 218, which couple or attach to the central portion 208, and defining apertures 220 between the collar 210 and the first end 208a of the central portion 208. For example, the apertures 220 may be aligned or disposed in register with the flared portions 214 of the flange 212.

Similarly, the first end 208a of the central portion 208 may be substantially crenelated in cross section, defining merlons or struts 221, which couple or attach to corresponding struts 218 of the collar 210.

The second component 204 comprises a substantially cylindrical central portion 222 and a collar 224 disposed at a second end 222b of the central portion 222. In the embodiment depicted in FIGS. 2 and 3, the central portion 222 has a diameter which is substantially similar to that of the collar 224. However, in some embodiments, the diameter of the central portion 222 may be greater than, substantially similar to, or less than the diameter of the collar 224.

In one embodiment, the plurality of apertures 216 is disposed around the perimeter of the collar 224, extending from an inner surface 226 of the collar 224 to an outer surface 228 of the collar 224. In one embodiment, the apertures 216 may be aligned or disposed in register with one another and/or may be evenly spaced around the perimeter of the collar 224.

In some embodiments, a plurality of slots 230 may be disposed around a perimeter of the central portion 222 towards its first end 222a. For example, the slots 230 may be employed to provide access to within the device 200 to remove materials utilised during the manufacturing process.

As depicted in FIG. 3, in some embodiments a plurality of elements 225 may be provided on the inner surface 226 of the collar 224 to increase or improve the rigidity of the collar 224 in a vicinity of the apertures 216. In some embodiments, the plurality of elements 225 may be spaced apart about the inner perimeter of the collar 224. For example, the elements 225 may be polyhedrons or substantially block shaped.

In some embodiments, the central portion 208 of the first component 202 and the central portion 222 of the second component 204 are coaxial with one another. In the embodiment depicted in FIGS. 2, 3 and 4, the central portion 222 of the second component 204 is the outermost of the two such that the central portion 208 of the first component 202 is enclosed or encircled by the central portion 222 of the second component 204. However, in some embodiments, central portion 208 of the first component 202 is the outermost of the two such that the central portion 222 of the second component 204 is enclosed or encircled by the central portion 208 of the first component 202.

In one embodiment, as depicted in FIGS. 2 and 4, the first end 222a of the second component 204 overlays the struts 221 of the central portion 208 and the collar 210 of the first component 202 extends beyond the first end 222a of the central portion 222 of the second component 204. Gaps 232 may be provided between the first end 222a of the central portion 222 and end walls 218a of the struts 218, for example, to allow restricted or limited movement or compression of the second component 204 relative to the first component 202.

The flared portions 214 of the flange 212 are arranged to cooperate with corresponding apertures 216 of the collar 224 of the second component 204, and may for example, extend through the apertures 216 of the collar 224. In one embodiment, as depicted in FIGS. 2 and 4, the flared portions 214 extend through the apertures 216. In some embodiments, the flared portions 214 extend through the apertures 216 such that an outer surface 236 of the rim 214a of the flared portion 214 is substantially flush with the outer surface 228 of the collar 224. Movement or extension of the second component 204 relative to the first component 202 may be restricted or limited by the size of the apertures 216.

Figure 6A:
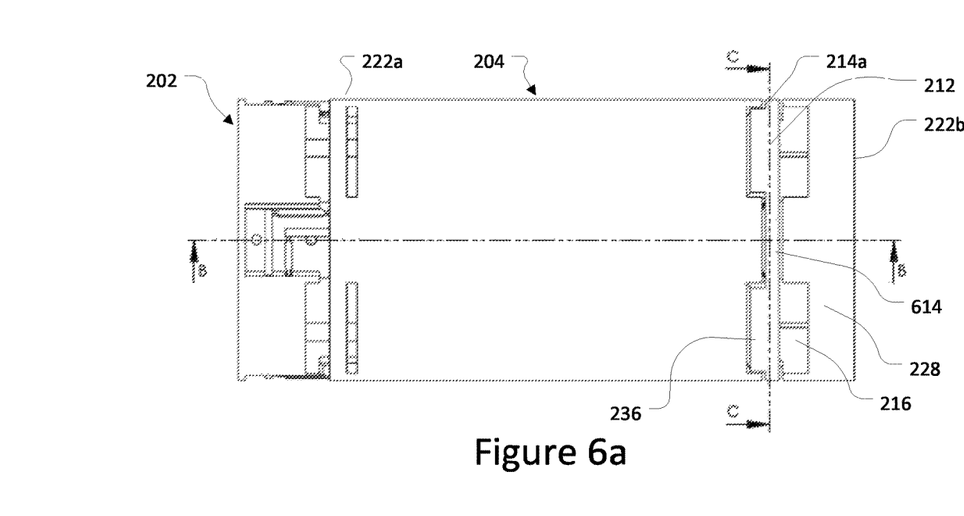
FIG. 6a is a side view of a balance device according to some embodiments.
Figure 6B:
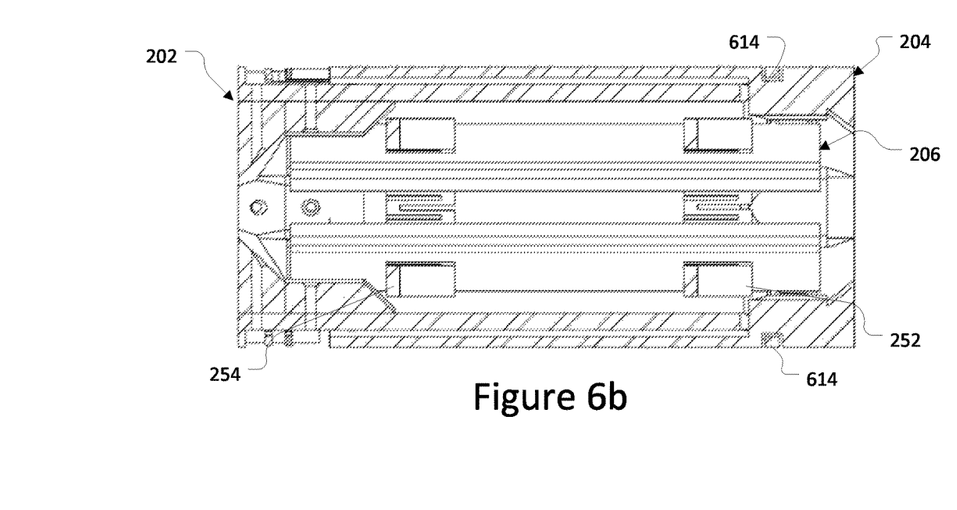
FIG. 6b is a cross sectional view of the balance device of 6a taken along a longitudinal axis A-A of the balance device.
Figure 6C:
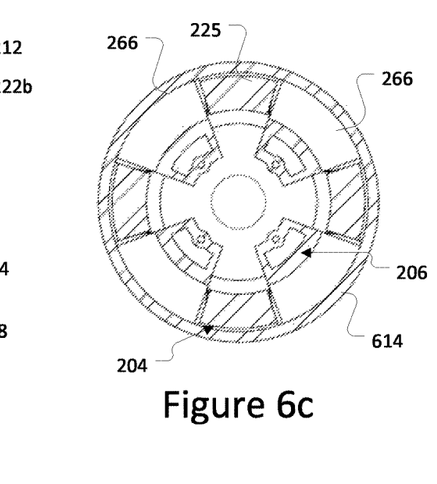
FIG. 6c is a cross sectional view of the balance device of 6a taken along an axis B-B
of the balance device.

As illustrated in FIGS. 6a, 6b and 6c, in some embodiments the flange 212 may comprise connecting members 614 to connect or interconnect the flared portions 214 of the flange 212 to improve or increase the rigidity of the flared portions 214. As depicted, the connecting members 614 extend from one flared portion 214 to a next or neighbouring flared portion 214. In some embodiments, the connecting members 614 may be recessed into the outer surface 228 of the collar 224. For example, the connecting members 614 may be substantially flush with the outer surface 228 of the collar 224 and/or the outer surface 236 of the rim 214a of the flared portion 214. The connecting member 614 may be relatively thin in the radially direction. The connecting member 614 may be formed integrally with the flared portions 214 or may be connected or coupled to the flared portions 214.

As best illustrated in FIG. 3, the third component 206 comprises a substantially cylindrical central portion 248 formed from a plurality of interconnected elongate rib members 250. Each rib member 250 is interconnected to its neighbouring rib member 250 by means of first and second arm members 252, 254, disposed towards first and second ends 250a, 250b, respectively, of the rib members 250. In this way, configuration of the interconnected elongate rib members 250 of the third component 206 may allow for deflection in the radial direction as discussed in more detail below. In some embodiments, the arm members 252, 254 may be substantially preferably s-shaped.

Although the rib members 250 of FIGS. 2 to 4 are interconnected to neighbouring rib members by means of first and second arm members 252, 254, in some embodiments, the rib members 250 may be interconnected to neighbouring rib members by a single arm member. In other embodiments, the rib members 250 may be interconnected to neighbouring rib members by more than two arm members.

In one embodiment, the third component 206 is the innermost or centre component of the device 200, and is coaxial with the first component 202 and the second component 204.

The coaxial configuration of the components 202, 204, 206 of the device may provide for increased stiffness to transverse forces or bending and increased stiffness to axial and transverse moments or torque.

In some embodiments, the first component 202 and the second component 204 are each coupled or interconnected to the third component 206.

A first set of connectors 258 may be provided to couple the first component 202 to a first end 248a of the central portion 248 of the third component 206. In some embodiments, a second set of connectors 260 may also be provided to couple the first component 202 to a second end 248b of the central portion 248 of the third component 206. For example, the connectors 258 of the first set may be disposed about the first component 202 in a spaced apart manner, for example, equidistant from one another, and/or in-register or aligned with one another and the connectors 260 of the second set may be disposed about the first component 202 in a spaced apart manner, for example, equidistant from one another, and/or in-register or aligned with one another.

In one embodiment, each connector 258 may extend from an inner surface 259 of the collar 210 of the first component 202 through apertures 220 to a corresponding outer surface 262 of the first end 250a of the rib members 250 of the third component 206. Furthermore, each connector of the second set of connectors 260 may extend from an inner surface 264 of the rim portion 214a of the flange 212 of the first component 202 to the corresponding outer surface 262 of the second end 250b of the rib members 250 of the third component 206.

A third set of connectors 268 may be provided to couple the second component 204 to the first end 248a of the central portion 248 of the third component 206. In some embodiments, a fourth set of connectors 266 may also be provided to couple the second component 204 to the second end 248b of the central portion 248 of the third component 206. For example, the connectors 268 of the third set may be disposed about the second component 204 in a spaced apart manner, for example, equidistant from one another, and/or in-register or aligned with one another and the connectors 266 of the fourth set may be disposed about the second component 204 in a spaced apart manner, for example, equidistant from one another, and/or in-register or aligned with one another.

In one embodiment, each connector 268 may extend from an inner surface 270 of the first end 222a of the central portion 222 of the second component 204 through apertures 220 of the first component 202 to the outer surface 262 of the first end 250a of the rib members 250 of the third component 206. Furthermore, each connector 266 may extend from the inner surface 226 of the collar 224 of the second component 204 to the outer surface 262 of the second end 250b of the rib members 250 of the third component 206.

In one embodiment, connectors 258 are disposed outer-most of or closer to the first end 250a of the rib members 250 than connectors 268 and connectors 266 are disposed outermost of or closer to the second end 250b of the rib members 250 than connectors 260.

Although the balance device of FIGS. 2 to 4 includes two sets of connectors 258, 260 to couple the first component 202 to the third component 206 and two sets of connectors 268, 266 to couple the second component 204 to the third component 206, in some embodiments, the balance device may include only a single set of connectors to couple the first component 202 to the third component 206 and a single set of connectors to couple the second component 204 to the third component 206. In other embodiments, more than two sets of connectors may be employed to couple each of the first and second components, 202, 204 to the third component 206.

The connectors 258, 260, 266, 268 may be designed or configured to be compliant in bending to accommodate axial movement in response to relative axial forces between the first and second components and to minimise or mitigate rotational movement about the longitudinal axis of the device 200 and minimise or mitigate deflections due to transverse forces and moments, for example, by being substantially rigid about the longitudinal axis.

Figure 5A:
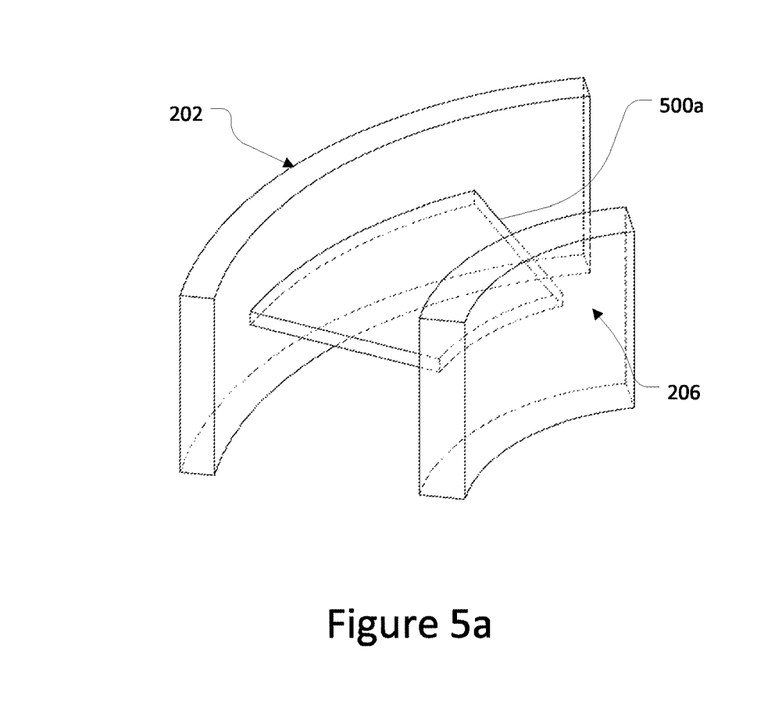
FIG. 5a is a side view of a single flexure hinge of the balance device of FIGS. 2 to 4.
Figure 5B:
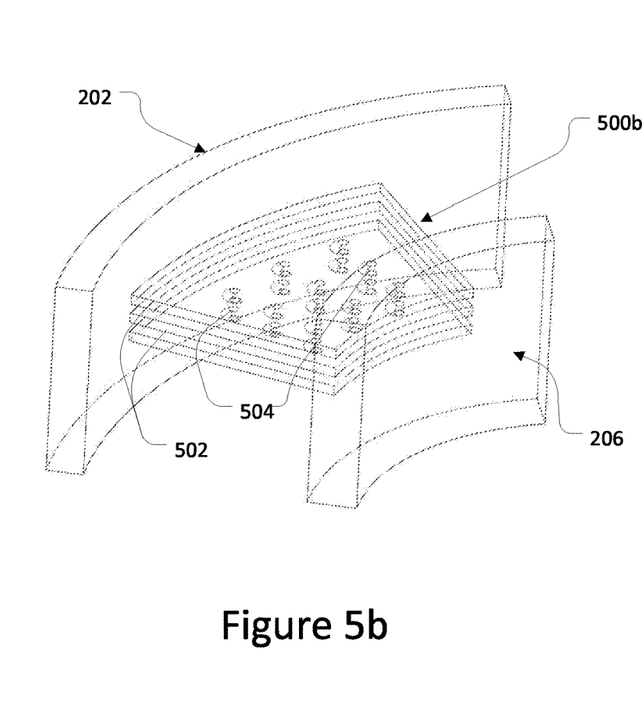
FIG. 5b is a side view of a multilayer flexure hinge of the balance device of FIGS. 2 to 4.

FIGS. 5a and 5b illustrate connector 258 coupling the first component 202 to the third component 206. The connector 258 comprises a hinge 500, such as a flexure hinge. The hinge 500 may be single layer hinge 500a as depicted in FIG. 5a or a multilayer hinge 500b, as depicted in FIGS. 5b. Multilayer hinges 500b may exhibit an increased transverse to axial stiffness ratio than single layer hinges 500a.

For example, if a single layer hinge 500a, with a thickness of $t_0$, results in a desired axial stiffness, a similar stiffness can be achieved with a multilayer hinge of the same planform area with the thickness $t_n$, $$t_n = \frac{t_0}{\sqrt[3]{n}}$$

where n is the number of layers in the hinge. The increase in transverse stiffness, $k_t$, due to the multilayer hinge will be approximately $$k_t = n^{\left(\frac{2}{3}\right)}.$$

As illustrated in FIG. 5b, the multilayer hinge 500b may comprise a plurality of multilayer hinge elements 502 interspersed or interleaved with supports 504. The supports 504 may provide support for a subsequent hinge element 502 and minimise or mitigate shear stress between the hinge elements 502. In some embodiments, the supports 504 allow a relatively small amount of vertical and transverse displacement between the hinge elements 502.

In one embodiment, the hinge elements 502 may be constructed by disposing supports 504 and hinge elements 502 on a planform area (X-Y plane) arranged perpendicularly to a vertical build axis (Z axis). In this way, the bending stiffness (axial direction) of the multilayer hinge may correspond substantially to that of a single hinge 500a and the cross-sectional area of the multilayer hinge may be greater than that of the single layer hinge 500a, thereby providing a greater stiffness to shear, tension and compressive loads, which may be of importance for transverse loads and moments, than that of the single layer hinge 500a. In some embodiments, a distance between subsequent hinge elements 502 is equal to or less that the thickness of the hinge elements 502. However, in some embodiments, the distance between subsequent hinge elements 502 may be greater than the thickness of the hinge elements 502.

Similarly, it will be appreciated that connectors 260, 266 and 268 may each comprise a hinge 500, such as a flexure hinge. In some embodiments, the hinge 500 may be a single layer hinge 500a or a multilayer hinge 500b, of the types of connector 258 described with reference to FIGS. 5a and 5b.

In some embodiments, the first, second, third and fourth sets of connectors 258, 260, 266 and 268 each comprise an even number of flexure hinges 500. For example, the first, second, third and fourth sets of connectors 258, 260, 266 and 268 may each comprise an even number of flexure hinges 500 of greater than two, i.e., four or more. In some embodiments, the flexure hinges 500 of a set of connectors 258, 260, 266 and 268 may be evenly spaced from each other. For example, such an arrangement of flexure hinges 500 may allow the balance device 200 to have multiple planes of symmetry that provide similar stiffness to transverse loads and/or moments.

In some embodiments, the device 200 may be employed as a transducer for measuring axial load or torque about the axial direction.

An axial load (not shown) applied to a second end or measurement end 201 of the device 200 along a longitudinal axis of the device 200, such as to the collar 224 of the second component 202, may be determined from the axial deflection or displacement of the first component 202 and second component 204 relative to one another, or by determining an axial deflection or displacement of the first component 202 relative to the third component 206 and determining an axial deflection or displacement of the second component 204 relative to the third component 206. Similarly, it will be appreciated that an axial load (not shown) applied to a first end or non-measurement end 203 of the device 200 along a longitudinal axis of the device 200, such as to the collar 210 of the first component 202, may be determined from the axial deflection or displacement of the first component 202 and second component 204 relative to one another, or by determining an axial deflection or displacement of the first component 202 relative to the third component 206 and determining an axial deflection or displacement of the second component 204 relative to the third component 206.

In some embodiments, the relative displacement of the first component 202 to the second component 204, or the relative displacement of the first component 202 to the third component 206 and the second component 204 to the third component 206 may be measured using a LVDT (linear variable differential transformer) or an optical technique, such as by using a Fabry-Perot interferometer.

By configuring the third component 206 to allow for radial deflection, stretching of the hinges 500 may be mitigated or minimised, and as a result, an applied axial load along the longitudinal axis of the device 200 may cause a more linear deflection of the second component 204 relative to the first component 202, thereby simplifying a determination of the axial force when the device is deflected by an unknown axial load.

In one embodiment, a first arm 272, such as a cantilever arm, may be provided for measuring axial deflection or displacement of the first component 202 and second component 204 relative to one another. Referring to FIGS. 2 and 4, the first arm 272 may be disposed on an inset or indented surface 234 of the strut 218 of the collar 210 of the first component 202.

In one embodiment, the first arm 272 comprises a first element 272a extending substantially transverse to or across a width of the strut 218, and a second element, 272b, extending from the first arm 272 substantially perpendicular to the first element 272a and toward the first end 222a of the central portion 222 of the second component 204. The second element 272b is arranged to couple to or connect to the first end 222a of the central portion 222 of the second component 204.

A sensor (not shown) comprising at least one strain gauge sensor is arranged to connect to the first arm 272 to determine the axial deflection or displacement of the second element 272b relative to a position or location at which the first element 272a connects to the strut 218, caused by the axial deflection or displacement the first component 202 relative to the second component 204 when an axial load (not shown) is applied to the second or measurement end 201 (or to the first or non-measurement end 203) of the device 200.

In one embodiment, drag force or axial deflection or displacement caused by an axial load may be determined by determining an axial deflection or displacement of the first component 202 relative to the third component 206 and determining an axial deflection or displacement of the second component 204 relative to the third component 206.

In one embodiment, axial force may be determined from the bending strain in the hinges 500. For example, strain gauges may be coupled or adhered to connectors 258, 260, 266, 268 and orientated to measure a bending stress in a radial direction.

The connectors 258, 260, 266, 268 are arranged or designed to mitigate or minimise rotational movement about the longitudinal axis of the device 200 and to mitigate or minimise deflections due to transverse forces and moments. For example, connectors 258, 260, 266, 268 may be substantially rigid about the longitudinal axis. Nonetheless, rotational movement of the connectors about the longitudinal axis may nonetheless occur in response to relative axial torque between the first and second components 202, 204, respectively.

An axial torque, i.e. moment about the axial direction, applied to the second end or measurement end 201 of the device 200, such as to the collar 224 of the second component 204, may be determined from a rotation about the longitudinal axis of the second component 204 relative to the first component 202, or by determining a rotation about the longitudinal axis of the second component 204 relative to the third component 206 and/or a rotation about the longitudinal axis of the third component 206 relative to the first component 202. Similarly, it will be appreciated that an axial torque (not shown) applied to the first end or non-measurement end 203 of the device 200, such as to the collar 210 of the first component 202, may be determined from a rotation about the longitudinal axis of the second component 204 relative to the first component 202, or by determining a rotation about the longitudinal axis of the second component 204 relative to the third component 206 and/or a rotation about the longitudinal axis of the third component 206 relative to the first component 202.

The relative rotation of the first component 202 to the second component 204 or the relative rotation of the second component 204 to the third component 206 and/or the relative rotation of the first component 202 to the third component 206 may be measured using a RVDT (rotational variable differential transformer) or the displacement due to the rotation may be measured using an optical technique, such as by using a Fabry-Perot interferometer.

In one embodiment, a second arm 274, such as a cantilever arm, may be provided for measuring axial rotation of the second component 204 relative to the first component 202. Referring to FIGS. 2 and 4, the second arm 274 may be disposed on the indented surface 234 of the strut 218 of the collar 210 of the first element 202.

In one embodiment, the second arm 274 comprises a first element 274a extending substantially transverse to or across a width of the strut 118, and a second element, 274b, extending from the second arm 274 substantially perpendicular to the first element 272a and toward the first end 222a of the central portion 222 of the second component 204. The second element 274b is arranged to couple to or connect to the first end 222a of the central portion 222 of the second component 204.

A sensor (not shown) comprising at least one strain gauge sensor is arranged to connect to the second arm 274 to determine the axial rotation of the first element 274b relative to the first element 274a, caused by the axial rotation of the second component 204 relative to the first component 202 when an axial torque is applied to the measurement end 201 (or to the first or non-measurement end 203) of the device 200.

In one embodiment, axial torque may be determined by measuring a rotation about the longitudinal axis of the second component 204 relative to the third component 202 and a rotation about the longitudinal axis of the third component 206 relative to the first component 202.

In one embodiment, axial torque may be determined from the shear stress in the hinges 500. For example, strain gauges may be coupled or adhered to connectors 258, 260, 266, 268 and orientated to measure the strain associated with shear stress in a circumferential direction.

The balance device 200 may be calibrated in a manner similar to that of the conventional internal balance 100. For example, known forces and moments may be applied between the first component 202 and the second component 204. An output from the sensor (not shown) while the balance device 200 is subject to a suitable range of known loads allows a calibration matrix to be generated. When the device is subject to an unknown load during use, an output from the sensor and the calibration matrix may be employed to determine the load.

In some embodiments, the device 200 may be employed as a coupling to interconnect a first unit to a second unit to provide a small amount of axial "play" or give between the first and second units. For example, the device 200 may be employed as a coupling to interconnect a motor and a shaft in environments where temperature changes may lead to expansion and contraction of the motor and/or shaft and wherein the coupling 200 is capable of accommodating the changes.

The stiffness of the components 202, 204, 206 and the connectors 258, 260, 266, 268 of the balance device 200 may depend on their shape and the materials from which they are composed. In some embodiments, the first and third sets of connectors, 258 and 268 may have a similar stiffness to the second and fourth sets of connectors 260 and 266 and the first component 202 and the second component 204 may be configured to have substantially similar bending and torsional stiffness. In one embodiment, all of the connectors 258, 260, 266, 268 have substantially similar bending and torsional stiffness.

In some embodiments, the third component 206 may be composed from similar or the same materials as the first and second components, 202, 204. In one embodiment, the third component is designed to be as stiff as possible without contributing excessive weight to the balance device 200.

In some embodiments, the device 200 is composed of metal, such as stainless steel. However, it will be appreciated that any suitable material may be employed, such as titanium or a polymer, for example.

In one embodiment, the device 200 is manufactured using additive manufacturing techniques, such as laser melting of metal, for example direct metal laser sintering (DMLS). However, it will be appreciated that any suitable methods may be employed for manufacturing the device 200.

Figure 7A:
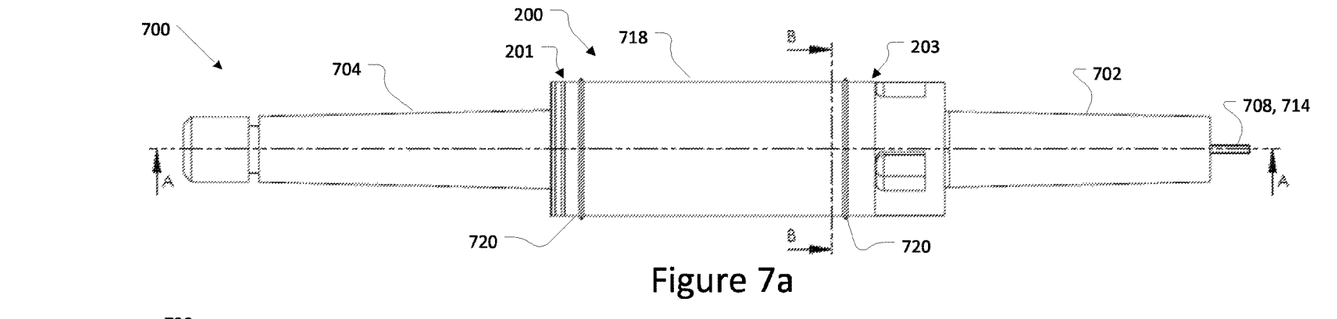
FIG. 7a is a side view of a balance device assembly including a balance device
according to some embodiments.
Figure 7B:
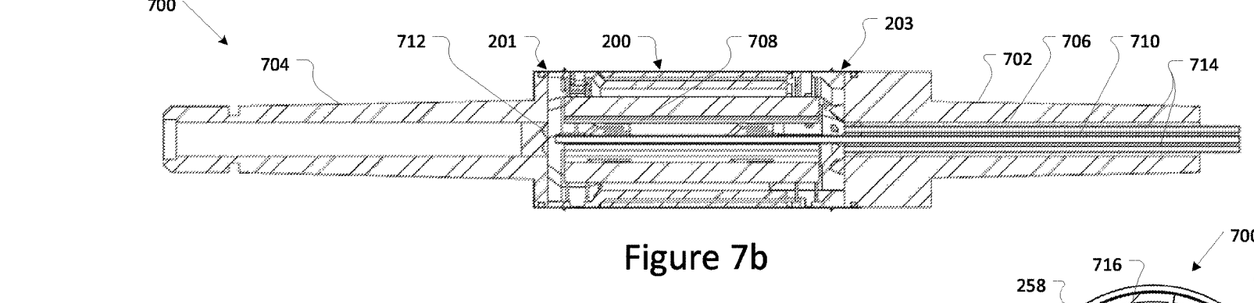
FIG. 7b is a cross sectional view of the balance device assembly of 7a taken
along a
longitudinal axis A-A of the balance device.
Figure 7C:
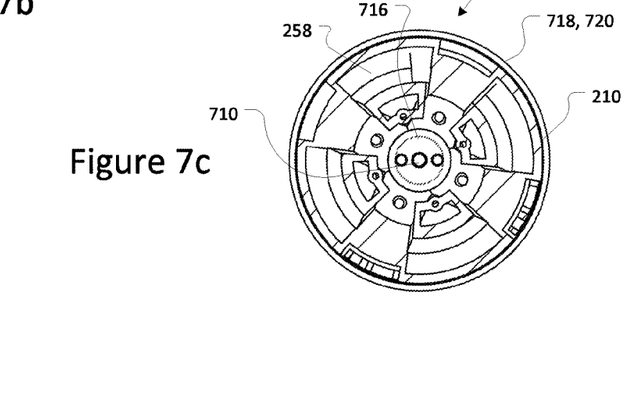
FIG. 7c is a cross sectional view of the balance device assembly of 7a taken along an axis B-B of the balance device.

Referring now to FIGS. 7a, 7b and 7b, there is illustrated a balance device assembly 700 according to some embodiments. The balance assembly 700 enables a fluid, such as air or gas, to be circulated within the balance device 200 to control a temperature of the balance device 200.

The balance assembly 700 may comprise the balance device 200, a shank or tang 702 coupled or connected to the first or non-measurement end 203 of the balance device 200 and a shaft 704 coupled or connected to the second or measurement end 201 of the balance device 200. The tang 702 may be configured to mount the balance device to an instrument, structure or fixture, such as a dynamometer or sting. The shaft 704 may be configured to mount the balance device to a model (not shown).

As illustrated in FIG. 7b, the tang 702 may include a channel 706 extending along its length to allow for fluid communication with a hollow interior or inner chamber 708 defined or formed by the balance device 200.

The balance device assembly 700 may comprise at least one conduit 710, such as inflow conduit. The conduit 710 may extend along the channel 706 of the tang 702 and at least partially through the balance device 200 to allow a fluid, such as a gas to liquid, to be conveyed to the chamber 708 of the balance device 200. In some embodiments, the conduit 710 may extend fully through or along the length of the balance device 200.

A plug 712 may be provided at the second or measurement end 201 of the balance device 200 to block or seal the measurement end 201 of the balance device 200 and/or to restrict communication of fluid from the measurement end 201 and chamber 708 of the balance device 200, for example, through the shaft 704. For example, the plug 712 may cooperate with the collar 224 and/or elements 225 of the second component 204 to block or seal the chamber 710 of the balance device 200.

The balance device assembly 700 may comprise one or more conduits 714, or outflow conduits. The conduits 714 may extend along the channel 706 of the tang 702 to the balance device 200 to allow a fluid, such as a liquid or gas to be conveyed from the chamber 710 of the balance device along the channel 706 of the tang 702.

In some embodiments, the balance device assembly 700 may comprise a plug 716 to receive and locate or position the conduits 710, 714 with respect to one another. For example, the conduits 710 may be positioned one on either side of the conduit 714. The conduits 710, 714 may extend through the plug 716. The plug 716 may span a cross section of the channel 706 of the tang 702. The plug 716 may be disposed at the non-measurement end 203 of the balance device 200 and/or may extend along at least a portion of the channel 706 of the tang 702. For example, the plug 716 may also be configured to cooperate with the collar 210 of the first component 202. The plug 716 may also restrict or control communication of fluid from the first or non-measurement end 203 and chamber 708 of the balance device 200, for example, through the channel 706 of the tang 702.

The balance device assembly 700 may comprise a tube or sleeve 718 arranged to receive the balance device 200 to assist in containing fluid within the chamber 710 of the balance device 200. The sleeve 718 may be a flexible sleeve. In some embodiment, the sleeve 718 may form a seal with the balance device 200. In some embodiments, bellows 720 may be incorporated into the sleeve 718 to increase the flexibility of the sleeve 718. For example, bellows 720 may be incorporated into the sleeve 718 at a region of the sleeve 718 toward the measurement end 201 and the non-measurement end 203 of the balance device 200.

The sleeve 718 may be composed of a flexible polymer (e.g. PET) or a more rigid material such as thin stainless steel sheet in which case the addition of bellows 720 may be incorporated into the sleeve 718.

The balance assembly 700 may enable a fluid, such as air or gas, to be circulated within the chamber 716 of balance device 200 via the conduits 706, 714 to thereby provide a temperature control mechanism to control a temperature of the balance device 200.

In some embodiments, the second end 201 of the balance device 200 may be employed as the non-measurement end of the balance device 200 and the first end 203 may be employed as the measurement end of the balance device 200. For example, the shank or tang 702 may be coupled or connected to the second end 201 of the balance device 200 and configured to be mounted to an instrument, fixture or structure and the shaft 704 may be coupled or connected to the first end 203 of the balance device 200 and configured to be mounted to a model (not shown). In such embodiments, the plug 712 may be provided at the first end 203 of the balance device 200 to block or seal the first end 203 and/or to restrict or control communication of fluid from the first end 203 of the balance device 200. For example, the plug 712 may cooperate with the collar 210 of the first component 202 to block or seal passages (not shown) extending through the collar 210 and in fluid communication with the chamber 210 of the balance device. Similarly, the plug 716 may be disposed at or toward the second end 201 of the balance device 200 and/or may extend along at least a portion of the channel of the tang 702.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A balance device comprising:
   first, second and third components including substantially cylindrical first, second and third central portions, respectively, wherein the first, second and third central portions are coaxial with one another and wherein at least one of the first and second central portions surrounds the other of the first and second central portions;
   a first set of connectors for coupling the first component to the third component;
   a second set of connectors for coupling the second component to the third component; and
   wherein the connectors accommodate axial movement in response to relative axial forces between the first and second components and minimise rotational movement about the axial direction in response to relative axial torque between the first and second components.

2. The balance device of claim 1, wherein the connectors are configured to be substantially rigid about the longitudinal axis of the device.

3. The balance device of claim 1, wherein the first component further comprises a collar disposed at a first end of the first central portion and a flange disposed at a second end of the first central portion.

4. The balance device of claim 1, wherein the second component further comprises a collar disposed toward a second end of the second central portion.

5. The balance device of claim 4, wherein a plurality of apertures are disposed around a perimeter of the collar of the second component.

6. The balance device of claim 5, wherein the flange of the first component is arranged to cooperate with the plurality of apertures of the collar of the second component such that movement of the second component relative to the first component is limited by the apertures.

7. The balance device of claim 1, wherein the first central portion is surrounded by the second central portion and movement of the second component relative to the first component is restricted by a collar of the first component.

8. The balance device of claim 7, wherein the collar of the first component has a diameter substantially equal to the diameter of the central portion of the second component.

9. The balance device of claim 1, wherein a collar of the first component extends beyond a first end of the second component to form a first end of the balance device and a collar of the second component forms a second end of the balance device.

10. The balance device of claim 1, wherein the third central portion comprises a plurality of elongate rib members interconnected by arm members.

11. The balance device of claim 1, wherein the third central portion is disposed innermost and forms a core of the coaxial central portions.

12. The balance device of claim 1, further comprising a third set of connectors for coupling the first component to the third component and a fourth set of connectors for coupling the second component to the third component.

13. The balance device of claim 12, wherein the first and third sets of connectors are axially displaced from one another and the second and fourth sets of connectors are axially displaced from one another.

14. The balance device of claim 1, wherein the sets of connectors each comprise at least three flexure hinges.

15. The balance device of claim 1, wherein the connectors comprise multilayer hinges.

16. The balance device of claim 15, wherein the multilayer hinge comprises a plurality of hinge elements interleaved with supports.

17. The balance device of claim 16, wherein a distance between subsequent hinge element of the multilayer hinge is less than or substantially equal to a thickness of the hinge element.

18. A transducer for measuring loads in the axial direction, the transducer comprising the balance device of claim 1, wherein the second component is arranged to receive an applied load.

19. The transducer of claim 18, wherein the balance device further comprises a first arm coupled between the first component and the second component, the first arm being arranged to determine a measure of axial deflection of the second component relative to the first component in response to an application of a load to the second component.

20. The transducer of claim 19, wherein at least one strain gauge sensor is arranged to connect to the first arm to determine the measure of axial deflection.

21. A transducer for measuring axial torque, the transducer comprising the balance device of claim 1, wherein the second component is arranged to receive an applied axial torque.

22. The transducer of claim 21, wherein the balance device further comprises a second arm coupled between the first component and the second component, the second arm being arranged to determine a measure of axial rotation of the second component relative to the first component in response to an application of an axial torque to the second component.

23. The transducer of claim 22, wherein at least one strain gauge sensor is arranged to connect to the second arm to determine the measure of axial torque.

24. A coupling for interconnecting a first unit to a second unit, wherein the coupling comprises the balance device of claim 1, to allow for a relatively small amount of movement between the first and second units.

25. A balance device assembly comprising:
   the balance device of claim 1; and
   a temperature control mechanism to control a temperature of the balance device.

26. The balance device assembly of claim 25, wherein the temperature control mechanism comprises:
   one or more conduits for conveying fluid to and/or from a chamber formed by the balance device; and
   a sleeve for receiving the balance device and arranged to contain fluid within the chamber.

27. The balance device assembly of claim 26, wherein the temperature control mechanism further comprises a plug disposed at a first end of the balance device to receive and position the conduits with respect to one another.

28. The balance device assembly of claim 27, wherein the plug disposed at the first end of the balance device is configured to restrict communication of fluid from the first end of the balance device.

29. The balance device assembly of claim 26, wherein the temperature control mechanism further comprises a plug disposed at a second end of the balance device to restrict communication of fluid from the second end of the balance device.

30. The balance device assembly of claim 26, further comprising a tang coupled to the balance device and configured to mount the balance device to an instrument or structure.

31. The balance device of claim 30, wherein the tang comprises a channel extending along its length to allow for fluid communication with the chamber of the balance device.

* * * * *